United States Patent [19]

Bare

[11] Patent Number: 4,808,062
[45] Date of Patent: Feb. 28, 1989

[54] APPARATUS FOR PICKING UP ROCKS

[76] Inventor: Keith L. Bare, R.R. 1, P.O. Box 134, Emmetsburg, Iowa 50536

[21] Appl. No.: 866,762

[22] Filed: May 27, 1986

[51] Int. Cl.⁴ .............................................. B66C 1/42
[52] U.S. Cl. ...................................... 414/703; 37/2 R;
294/105; 172/491; 172/501; 172/254; 414/740
[58] Field of Search ........................ 414/703, 739, 740;
294/105, 104, 88, 107; 172/491, 501, 254; 37/2 R

[56] References Cited

U.S. PATENT DOCUMENTS

| | | | |
|---|---|---|---|
| 774,646 | 11/1904 | Cady | 294/107 X |
| 2,745,565 | 5/1956 | Johnson | 414/740 |
| 2,883,230 | 4/1959 | Miller | 294/107 X |
| 2,908,409 | 10/1959 | Hinders et al. | 37/2 R X |
| 3,468,442 | 9/1969 | Sarvela et al. | 414/703 |
| 3,643,920 | 2/1972 | Widegren et al. | 254/124 |
| 4,517,755 | 5/1985 | Nicholson | 414/740 X |

Primary Examiner—Robert J. Spar
Assistant Examiner—Donald W. Underwood
Attorney, Agent, or Firm—David C. Larson

[57] ABSTRACT

An apparatus for picking up rocks, which attaches to an agricultural tractor and functions to pick up rocks located on or partially embedded in the soil of a field, is provided. The three embodiments disclosed all function in a similar manner with one fixed jaw and one movable jaw, with each embodiment containing interlocking tines to close beneath and lift up the rock to be moved.

8 Claims, 3 Drawing Sheets

APPARATUS FOR PICKING UP ROCKS

BACKGROUND OF THE INVENTION

The present invention relates generally to agricultural tractor accessories and more particularly to a an apparatus for picking up rocks that attaches to the rear of an agricultural tractor and functions to pick up and remove rocks and boulders from a field in preparation for plowing and planting.

Agriculturalists involved with the planting, growing, and harvesting of crops have long been acquainted with the problems encountered when rocks or boulders are present in a field. A particular problem is the damage which can occur to plows and cultivators when they strike rocks laying on or embedded in the field being worked. Although encountered world wide, the problem of field rocks is particularly prevalent in the plain states of the United States, where numerous rocks were deposited along with the rich soil during the glacier period. Further, the problem cannot be eleviated by one cleaning of the field, due to the fact that from year to year as the ground is worked, and as the soil freezes and thaws the rocks located beneath the surface of the earth and in the subsoil, continue to work their way to the top. A further problem is apparent when it is realized that partially embedded boulders cannot be removed until the soil has thawed and is pliable. This causes the agriculturalist to spend valuable time in the spring dislodging and removing rocks during a time that would be optimumly used for planting.

In the past, rocks have been cleared from a field either by manual labor lifting them onto a flat-bed trailer, or, in the case of larger boulders, by manipulating the rocks into the bucket of a front-end loader or caterpillar. Often times, partially buried boulders would have to be dug out or pulled out with the use of chains, before they could be removed from the field. Although current methods for removing rocks from fields have generally been successful, they typically involve time consuming and back-breaking work that erodes the time and energy of the agriculturalist, which would be better spent in the actual growing of the crops.

Modern farms are typically larger than in the past, and the modern farmer typically uses larger and more sophisticated machinery than in the past. This increase in size and sophistication has allowed agriculturalists to cover more ground faster than in the past, thus increasing food production. However, regardless of size or sophistication, the same basic steps or procedures must be followed to progress from barren field to ripened harvest. One of the necessary steps in the growing process is to insure that the field is clear of equipment damaging rocks and boulders to avoid costly down-time for repairs or replacement of damaged or broken parts. The small scale farmer, as well as the large corporate farm, have a need for equipment and procedures which shorten the steps in the production chain, and thereby increases efficiency and productivity.

SUMMARY OF THE INVENTION

Accordingly, the present invention provides an apparatus for picking up rocks which allows an agriculturalist to clear a field of rocks or boulders quickly and efficiently in preparation for planting.

An object of the present invention is to provide an apparatus for the removal of rocks or boulders resting on or partially embedded in an agricultural field.

Another object is to provide a labor saving apparatus for use during the field clearing stage of the crop production process.

A further object of the invention is to provide a time saving apparatus for use during the field clearing stage of the crop production process.

Still another object is to provide an apparatus for picking up rocks that adapts to and cooperates with existing agricultural tractors owned by the farmer.

Yet another object is to provide a rock picking apparatus that is easy to operate, and requires no special training or skills on the part of the farmer.

Other objects, advantages and novel features of the present invention will become apparent from the following detailed description of the invention, when considered in conjunction with the accompanying drawings.

DESCRIPTION OF THE PREFERRED EMBODIMENT

Figure 1:
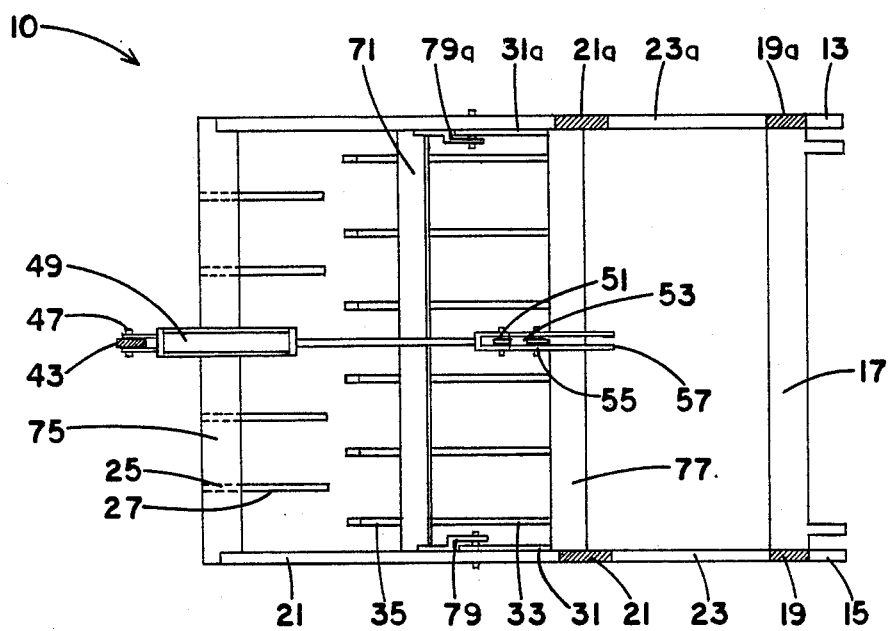
FIG. 1 shows a section view of the preferred embodiment of the rock picker of the present invention taken along section lines 1—1 of FIG. 2 showing the rock picker with the tines in a closed position.
Figure 2:
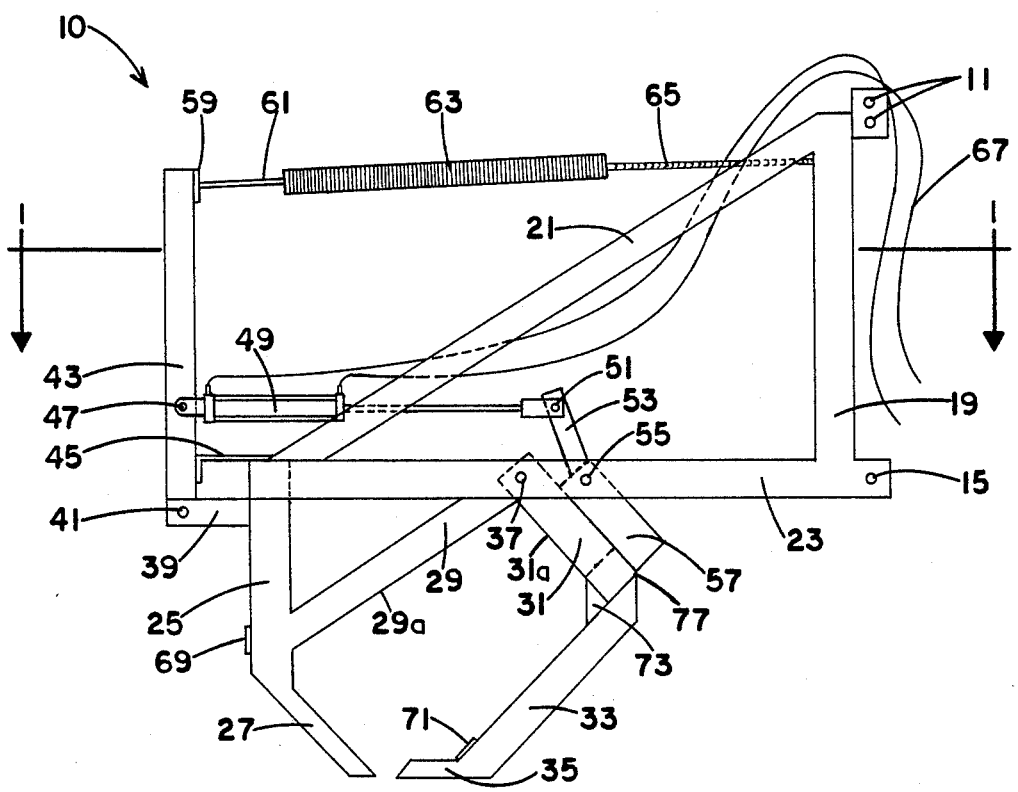
FIG. 2 shows a side view elevation of the preferred embodiment of the rock picker of the present invention showing the rock picker with the tines in a closed position.
Figure 3:
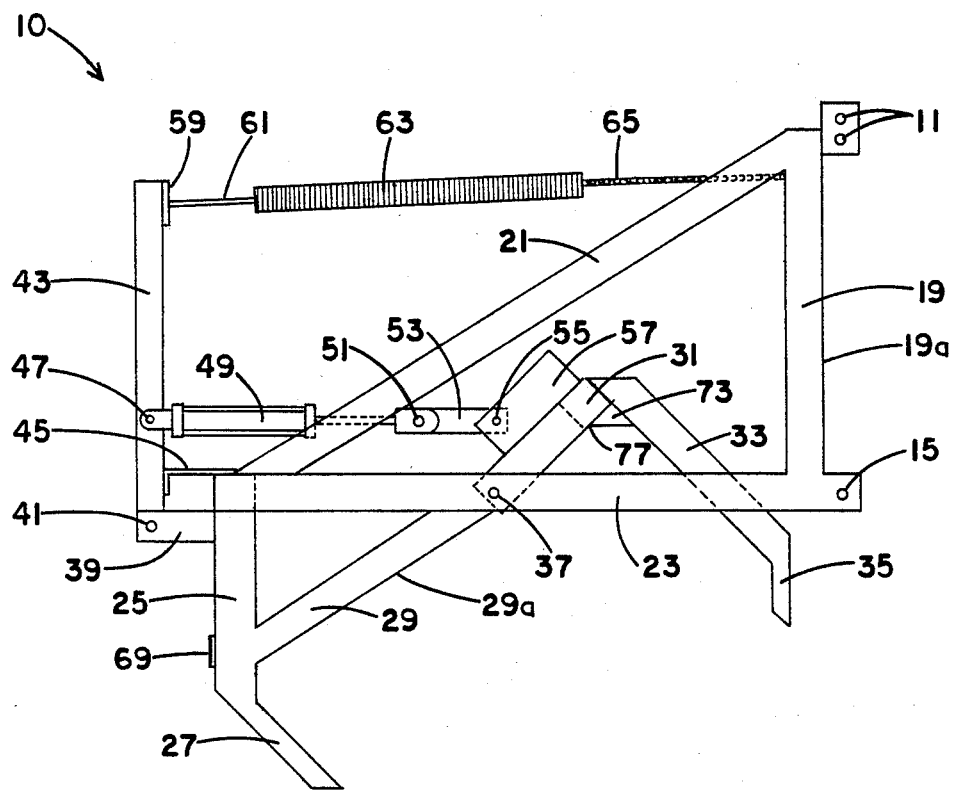
FIG. 3 shows a side view elevation of the preferred embodiment of the rock picker of the present invention showing the rock picker with the tines in an open position.
Figure 4:
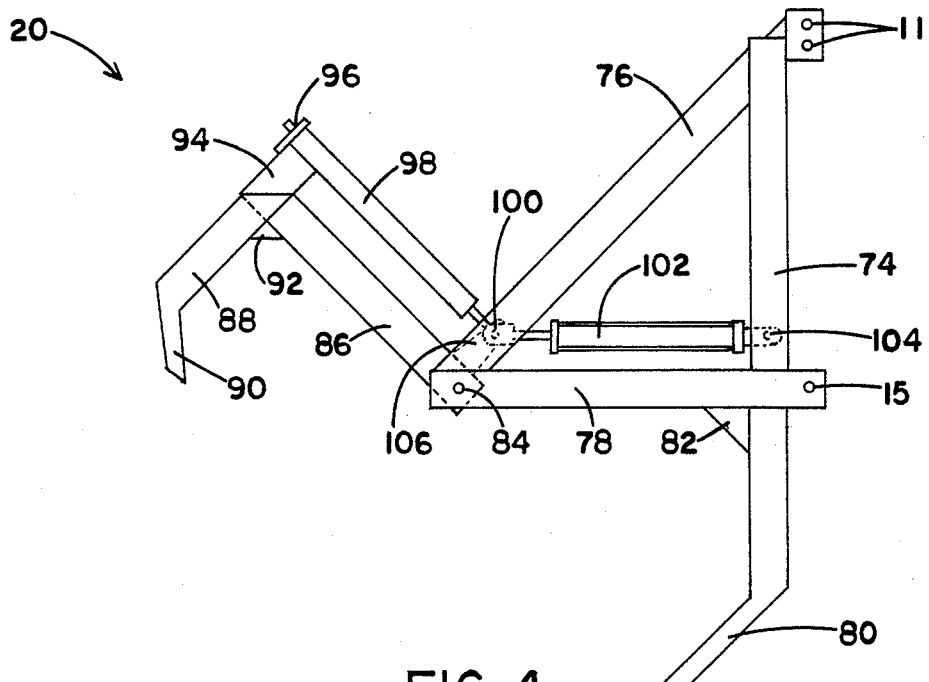
FIG. 4 shows a side view elevation of an alternate embodiment of the present invention wherein the front jaw is fixed and the rear jaw is moveable.
Figures 5, 6:
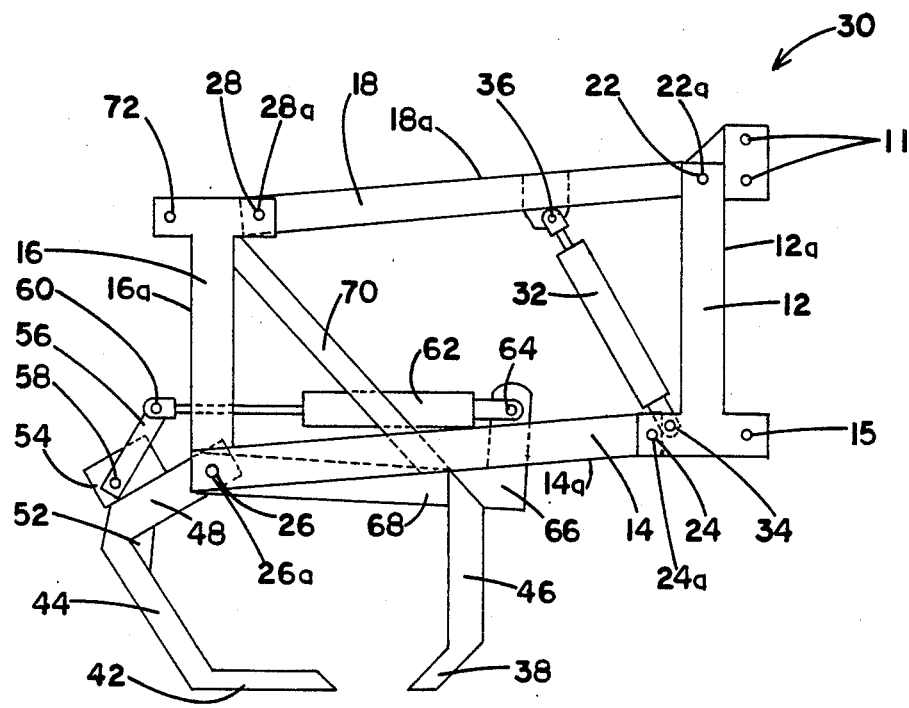
FIG. 5 shows a side view elevation of a second alternate embodiment of the present invention containing a rectangular extention which allows the jaws of the rock picker to be lifted to a higher elevation for discharge.
FIG. 6 shows a side view elevation of the second alternate embodiment of the present invention in the raised mode with the jaws open for discharge.

Referring now to the drawings wherein FIGS. 1, 2 and 3 disclose the preferred embodiment, FIG. 4 discloses the rear opening alternate embodiment, and FIGS. 5 and 6 disclose the high lift alternate embodiment, FIG. 1 shows the preferred embodiment of the apparatus for picking up rocks of the present invention indicated generally at 10. The apparatus 10 includes a frame comprised of a forward channel 17, and rear channel 75 affixed in a parallel relation to a first side bar 23 and second side bar 23a. Extending upwards from the location where the forward channel 17 is affixed to the first side bar 23 and second side bar 23a, is a first vertical support 19 and a second vertical support 19a. The first vertical support 19 and second vertical support 19a are maintained in a parallel relation by an upper channel, spanning between them and affixed to the tops thereof. The framework is completed by a first strengthening bar 21, and a second strengthening bar 21a extending on the diagonal upwards from the end of rear bar 75 to the tops of vertical support 19 and 19a respectively.

Affixed to and extending downward from the rear bar 75 are fixed jaw bars 25 with the ends thereof narrowing and angling forward in a fixed position to form fixed tines 27. A jaw strengthening bar 29 is affixed to the fixed jaw bar 25 on one end at a point slightly above where the fixed tines 27 angle in, and on the other end at a point on the lower side of first side bar 23. A corresponding jaw strengthening bar 29a is affixed in a similar manner to the fixed jar bar 25 on the far end of the rock lift 10 which cooperates with jaw strengthening bar 29 to hold the fixed jar bars 25 in a fixed position. A strengthening plate 69 is affixed across the back of each of the fixed jaw bars 25 to further strengthen and immobilize the fixed jaw bars 25.

A first hinge bar 31 is rotatably attached on the inside of the first side bar 23 at pivot pin 37, and a second hinge bar 31a is attached in a like manner to the second side bar 23a. To provide synchronized movement of the first hinge bar 31 with the second hinge bar 31a, square tubbing 77 spans the distance between them and connects the free end of first hinge bar 31 to the free end of second hinge bar 31a. Moveable tines 33 are affixed at intervals along the lower front side of square tubbing 77 in a position approximately perpendicular to the first hinge bar 31 and second hinge bar 31a. Corner plates 73 are affixed at the inside corner formed by the square tubbing 77 and moveable tines 33 to strengthen the connection. The ends of the moveable tines 33 narrow and angle rearward to form claws 35. A strengthening plate 71 is affixed across the moveable tines 33 near the point where they narrow and bend into claws 35 to provide strengthening and insure that the tines 33 will move as a unit.

The length of hinge bars and 31 and 31a, together with the length of moveable tines 33 and claws 35, together with the obtuse angular relationship between the tines 33 and claws 35 and the position of the pivot pin 37, cooperate to result in claws 35 being in a horizontal relation to the ground, when the jaws of the rock picker 10 are in a closed position. This cooperation results in the fixed tines 27 and the claws 35 cooperating in a grasping motion, when the rock picker 10 is in operation. As can best be seen in FIG. 3, in actual use, the rock picker 10 is maneuvered to position with the rock immediately in front of fixed tines 27. The rock picker 10 is then lowered down through the use of the 3 point hitch on the farm tractor to place the bottom of the fixed tines 27 beneath the center of gravity of the rock. The hinge bars 31 and 31a, the moveable tines 33 and the claws 35 are then rotated down into a closed position, as can best be seen in FIG. 2, thereby grasping the rock within the jaws of the rock picker 10.

The power mechanism for the rock picker 10 is provided by a hydraulic cylinder 49, connected to the link 53 by pivot pin 53 as well known in the art. The link 53 is then connected to a clevis 57 at pivot pin 55, with the clevis 57 affixed to the square tubbing 77, thus providing for the movement of the back jaw mechanism around pivot pin 37.

The rear end of hydraulic cylinder 49 is attached at pin 47 to a release bar 43. The release bar 43 is maintained in a generally vertical position at the rear of the rock picker 10, by attachment at it's lower end at pivot pin 41 to a clevis 39 which is affixed to the back of the center of the fixed jaw bars 25. The top end of the release bar 43 is then connected to the front of the rock picker 10 by use of a spring mount 59, spring connecting bar 61, heavy duty spring 63 and chain 65. In the preferred embodiment dual chain 65, dual spring 63 and dual spring connecting bar 61 attach to spring mount 59 at two points spaced equally on each side of the release bar 43. When an extremely stiff spring 63 is used, the spring mount 59 can be eliminated, and the spring connecting bar can be attached directly to release bar 43 with the same result. A release stop 45 is affixed to the top rear of the rear bar 75 to prevent the spring 63 from pulling the release bar 43 forward, and thereby causing the rock picker 10 to close prematurely. In operation, the stiffness of the spring 63 and the moment arm created by the distance between pivot pin 47 and the spring mount 59 cooperate to prevent movement of release bar 43 until there is an overload placed on hydraulic cylinder 49. The purpose of the release bar and associated parts is to prevent damage to the rock picker 10 when a rock becomes lodged in-between the fixed tines 27 and claws 35 during operation. Tyically, the release bar 43 will remain vertical during normal operation of the rock picker 10.

The rock picker 10 is attached to a standard 3-point hitch on agricultural tractors through the use of first mounting apertures 11, second mounting aperture 13, and third mounting aperture 15, as well known in the art. When thus connected to the 3-point hitch, the hydraulic cylinder 49 can be connected to the agricultural tractor's hydraulic system through hydraulic line 67. In use, the 3-point hitch will be in a raised position, and the tractor driven to the location of the rock to be removed. The rock picker 10 will then be lowered down over the rock, the jaw mechanism closed, and the rock picker 10 then lifted and driven to the point of deposit.

FIG. 4 discloses the rear opening alternate embodiment of the rock picker indicated generally at 20. The rear opening embodiment 20 includes a frame comprised of a side bar 78, a vertical support 74 and a strengthening bar 76 affixed together to form a triangular shaped frame as best seen in FIG. 4. There is a second triangular frame located directly behind the above described triangular frame, which is connected by tubing in the same manner as the preferred embodiment which can best be seen in FIG. 1.

Extending downward with the ends thereof narrowing and angling forward in a fixed position are tines 80. A plate 82 is affixed across the lower corner where side bar 78 crosses vertical support 74 in order to strengthen the vertical support 74 during the operation.

A hinge bar 86 is connected to side bar 78 at pivot point 84 in the same manner as hinge bar 31 in the preferred embodiment. Hinge bar 86 connects to tines 88 ending in claws 90 and strengthened by plate 92 to complete the moveable jaw portion of the rear opening embodiment in the same manner as the moveable jaw portion of the preferred embodiment.

The rear opening embodiment is powered by a hydraulic cylinder 102 connected on one end to vertical support 74 at pin 104, and connected at the other end to connecting link 106 by connecting pin 100. Also connecting to the connecting link 106 at connecting pin 100 is compression cylinder 98, which can be composed of a spring, shock absorber or other compression cylinder as well known in the art. The compression cylinder 98 is affixed at the other end to plate 96 which is affixed to release support bar 94. The hydraulic cylinder 102, the compression cylinder 98 and the linkages cooperate to raise and lower the moveable jaw in the same manner as in the forward opening preferred embodiment wherein the power source is centered within the symmetrical frame and jaws the rock picker.

The rock picker as disclosed in the rear opening embodiment mounts on a standard three-point hitch on agricultural tractors through the use of mounting apertures 11, second mounting aperture 15 and third mounting aperture 13 as well known in the art.

FIGS. 5 and 6 disclose the high lift alternate embodiment of the rock picker indicated generally at 30, with FIG. 5 showing the high lift embodiment in a closed, lowered position and FIG. 6 showing the high lift embodiment in a raised, open position. The high lift embodiment consists of a frame and claw configuration similar to the previous two embodiments, which is mounted on an adjustable rectangular frame which operates to lift the frame and claw configuration to a higher position than possible using only the three point hitch of an agricultural tractor.

The frame and claw portion of the high lift embodiment consists of a first vertical support 16, a jaw bar 68 and a strengthening bar 70 affixed together to form a triangular shaped frame as best seen in FIG. 5. There is a second triangular frame located directly behind the above described triangular frame, which is connected by tubing in the same manner as the previous two embodiments.

Affixed to and extending down from the jaw bar 68 is a fixed jaw bar 46 ending in fixed tines 38. Only the outer most jaw and tine appear in the side elevation, with it being understood that there is a plurality of jaws and tines in the grasping portion of the invention the same as disclosed in FIG. 1 for the preferred embodiment.

The fixed jaw bar 46 and fixed tines 38 cooperate with a hinge bar 48 connected to claws 42 through moveable tines 44 to grasp rocks during the picking process. The angle between the hinge bar 48 and moveable tines 44 is strenthened by support plate 52 and the hinge bar 48 is rotatably mounted to the jaw bar 68 at hinge pin 26.

The grasping portion of the high life embodiment is powered by a hydraulic cylinder 62 attached on one end to cylindrical support bar 66 by a connecting pin 64 and on the other end to a connecting link 56 by connecting pin 60. The connecting link 56 is in turn attached at connection pin 58 to a connecting plate 54 which is affixed to the horizontal tubing in the same manner as in the previous two embodiments.

The lifting portion of the high lift embodiment consists of two vertical supports 12 and 12a, which are attached at hinge pins 24 and 24a to lower bars 14 and 14a and attached at hinge pins 22 and 22a to upper bars 18 and 18a. Vertical supports 16 and 16a complete the rectangular lifting structure by connecting at hinge pins 26 and 26a to lower bars 14 and 14a connecting at hinge pins 28 and 28a to upper bars 18 and 18a. In the high lift embodiment, the directions which the jaws open can be reversed by removing hinge pins 28 and 26 and rotating the grasping portion of the invention 180 degrees about a vertical axis and reconnecting hinge pin 26 and hinge pin 72.

The lifting portion of the high lift embodiment is powered by hydraulic cylinder 32 connecting on one end at connecting pin 34 and on the other end at connecting pin 36.

The high lift embodiment is connected to the three point hitch of an agricultural tractor in the same manner as the previous two embodiments through the use of mounting apertures 11 and 15.

The two alternative embodiments incorporate the same basic structure as the preferred embodiment with the rear opening embodiment reversing the direction of movement of the moveable claw and the high lift embodiment incorporating a rectangular frame structure to raise and lower the grasping portion of the invention a greater distance than is possible through use of the standard three point hitch on agricultural tractors. All three preferred embodiments are constructed of iron, although it is understood that other metals or alloys of similar strength characteristics would be equally acceptable.

I claim:

1. An apparatus for picking up rocks from a field comprising:
    a frame for attachment in the front to a three point hitch of an agricultural tractor;
    a fixed jaw extending downward from the rear of the frame consisting of a plurality of vertical tines with the ends thereof narrowing and angling forward,
    a strengthening plate affixed laterally across the vertical tines, and
    two strengthening bars extending diagonally from approximately the point where the vertical tines narrow and angle forward, to approximately the point where the moveable jaw is rotatably mounted on the frame;
    a moveable jaw rotatably mounted on the frame for cooperating with the fixed jaw to grasp and pick up rocks;
    a hydraulic cylinder for rotating the moveable jaw; and
    spring release means attached to the hydraulic cyclinder for preventing damage to the jaw during operation.

2. The apparatus as recited in claim 1, wherein the moveable jaw comprises:
    square tubing;
    a first hinge bar rotatably attached to the frame on one end and affixed to one end of the square tubing on the other end;
    a second hinge bar rotatably attached to the frame on one end and affixed to the other end of the square tubing on the other end;
    a plurality of tines with the ends thereof narrowing and angling rearward affixed to the square tubing and extending generally downward; and
    a strengthening plate affixed laterally across the tines.

3. The apparatus as recited in claim 1, wherein the spring release means comprises:
    a clevis affixed to and extending outward from the lateral center of the fixed jaw;
    a release bar rotatably attached to the clevis for connection to the hydraulic cylinder;
    a spring connected between the top of the release bar and the top of the frame; and
    a release stop for preventing the release bar from being rotated too far forward by the spring.

4. The apparatus as recited in claim 2, wherein the spring release means comprises:
    a clevis affixed to and extending outward from the center most vertical tine of the fixed jaw;
    a release bar rotatably attached to the clevis for connection to the hydraulic cylinder;
    a spring connected between the top of the release bar and the top of the frame; and a release stop for preventing the release bar from being rotated too far forward by the spring.

5. An apparatus for picking up rocks from a field comprising:
- a frame for attachment in the front to a three point hitch of an agricultural tractor;
- a fixed jaw extending downward from the forward part of the frame;
- a moveable jaw rotatably mounted at the rear of the frame for cooperating with the fixed jaw to grasp and pick up rocks;
- a hydraulic cylinder for rotating the moveable jaw;
- a release support bar extending upward from the lateral center of the moveable jaw;
- an end plate affixed to the top of the release support bar; and
- a compression spring connected on one end to the end plate and on the other end to the hydraulic cylinder.

6. An apparatus for picking up rocks from a field comprising:
- a frame for attachment in the front to a three point hitch of an agricultural tractor;
- a fixed jaw extending downward from the forward part of the frame consisting of a plurality of tines with the ends thereof narrowing and angling rearward;
- a moveable jaw consisting of square tubing, a first hinge bar rotatably attached to the frame on one end and affixed to one end of the square tubing on the other end, and second hinge bar rotatably attached to the frame on one end and affixed to the other end of the square tubing on the other end, and a plurality of tines with the ends thereof narrowing and angling forward affixed to the square tubing and extending generally downward rotatably mounted at the rear of the frame for cooperating with the fixed jaw to grasp and pick up rocks;
- a hydraulic cylinder for rotating the moveable jaw;
- a release support bar extending upward from the centermost tine of the moveable jaw;
- an end plate affixed to the top of the release bar; and
- a compression spring connected on one end to the end plate and on the other end to the hydraulic cylinder.

7. An apparatus for picking up rocks from a field comprising:
- an adjustable rectangular frame for attachment in the front to a three point hitch of an agricultural tractor with the rectangular frame including two vertical supports;
- a first hydraulic cylinder for adjusting the height of the rear portion of the rectangular frame;
- a triangular frame including the two vertical supports of the rectangular frame that serve as a common member of both frames for affixing the triangular frame to the rear of the rectangular frame;
- a fixed jaw extending downward from the forward part of the triangular frame;
- a moveable jaw rotatably mounted at the rear of the triangular frame for cooperating with the fixed jaw to grasp and pick up rocks; and
- a second hydraulic cylinder for rotating the moveable jaw.

8. The apparatus as recited in claim 7, wherein the two vertical supports that are common members of the rectangular frame and triangular frame are "T" shaped with pivot means at opposite ends of the bar forming the horizontal top of the "T" and pivot means at the bottom of the bar forming the vertical base of the "T" for reversing the direction of attachment of the triangular frame to the rectangular frame.

* * * * *